United States Patent
Jaiswal et al.

(10) Patent No.: US 8,249,225 B2
(45) Date of Patent: Aug. 21, 2012

(54) IDENTIFYING CALLER PREFERENCES BASED ON VOICE PRINT ANALYSIS

(75) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 12/048,346

(22) Filed: Mar. 14, 2008

(65) Prior Publication Data

US 2009/0232296 A1 Sep. 17, 2009

(51) Int. Cl.
*H04M 1/64* (2006.01)

(52) U.S. Cl. ........... 379/88.02; 379/265.12; 379/351; 379/388.04; 379/388.05; 379/406.03

(58) Field of Classification Search ........... 379/265.12, 379/88.01, 221.01, 142.1, 441, 433.01; 704/245, 704/236, 250
See application file for complete search history.

(56) References Cited

U.S. PATENT DOCUMENTS

| | | | |
|---|---|---|---|
| 6,173,260 B1 | 1/2001 | Slaney | |
| 6,385,302 B1 * | 5/2002 | Antonucci et al. | 379/45 |
| 6,567,776 B1 * | 5/2003 | Chang et al. | 704/236 |
| 7,317,932 B2 * | 1/2008 | Lai et al. | 455/556.1 |
| 2003/0169857 A1 * | 9/2003 | Akhteruzzaman et al. | 379/88.01 |
| 2004/0096050 A1 * | 5/2004 | Das et al. | 379/265.12 |
| 2004/0252855 A1 * | 12/2004 | Vasserman et al. | 381/331 |
| 2005/0286705 A1 | 12/2005 | Contolini et al. | |
| 2007/0100628 A1 * | 5/2007 | Bodin et al. | 704/261 |
| 2008/0075238 A1 * | 3/2008 | Winslow et al. | 379/88.01 |
| 2008/0255850 A1 * | 10/2008 | Cross et al. | 704/275 |
| 2009/0112596 A1 * | 4/2009 | Syrdal et al. | 704/260 |
| 2009/0119102 A1 * | 5/2009 | Bangalore et al. | 704/240 |

FOREIGN PATENT DOCUMENTS

WO 2006101952 A2 9/2006

* cited by examiner

*Primary Examiner* — Joseph J Nguyen

(74) *Attorney, Agent, or Firm* — Yudell Isidore Ng Russell PLLC

(57) ABSTRACT

A call directing system receives an incoming call from a caller. The caller is prompted to speak, thus enabling a prosody analyzer to generate an analysis of a prosody of the caller's voice. This analysis provides a basis for generating a caller profile that describes caller preferences of the caller. Based on the analysis of the prosody of the caller's voice and the generated caller profile, the call is directed to a particular call recipient.

20 Claims, 7 Drawing Sheets

IDENTIFYING CALLER PREFERENCES BASED ON VOICE PRINT ANALYSIS

BACKGROUND OF THE INVENTION

1. Technical Field

The present disclosure relates in general to the field of telecommunications, and more particularly to voice telephone calls. Still more particularly, the present disclosure relates to directing voice telephone calls to a desired call recipient.

2. Description of the Related Art

Call centers are effective units for receiving and directing calls from customers. The calls may be for requests for a service, a new product, product support, etc. In an effort to direct an incoming call to an appropriate representative, many call centers utilize an Interactive Voice Response (IVR) system. An IVR asks the caller directed questions, such as "Please say the name of the person of department to whom you wish to speak." If the caller does not know to whom she wishes to speak, many IVR systems will lead the caller through a matrix of questions or prompts from a lengthy menu. That is, the caller will be instructed to wait and listen to a complete list of primary options (often as many as ten or more); select one of these primary options (e.g., "Sales"); wait and listen to a subsequent list of secondary sub-options based on the selected primary option; and then select one of these secondary sub-options (e.g., "Electronics"). This process repeats in a recursive and narrowing manner until the caller reaches her desired party, or else simply gives up in frustration.

SUMMARY OF THE INVENTION

A call center receives an incoming call. The caller is prompted to speak, thus enabling a voice analyzer to evaluate the prosody (e.g., tone, accent, pitch, loudness, etc.) of the caller's voice, in order to create a profile for the caller. Based on the analysis of the prosody of the caller's voice and a resulting caller profile, the incoming call is directed to a representative, in the call center, who best matches the caller's profile.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
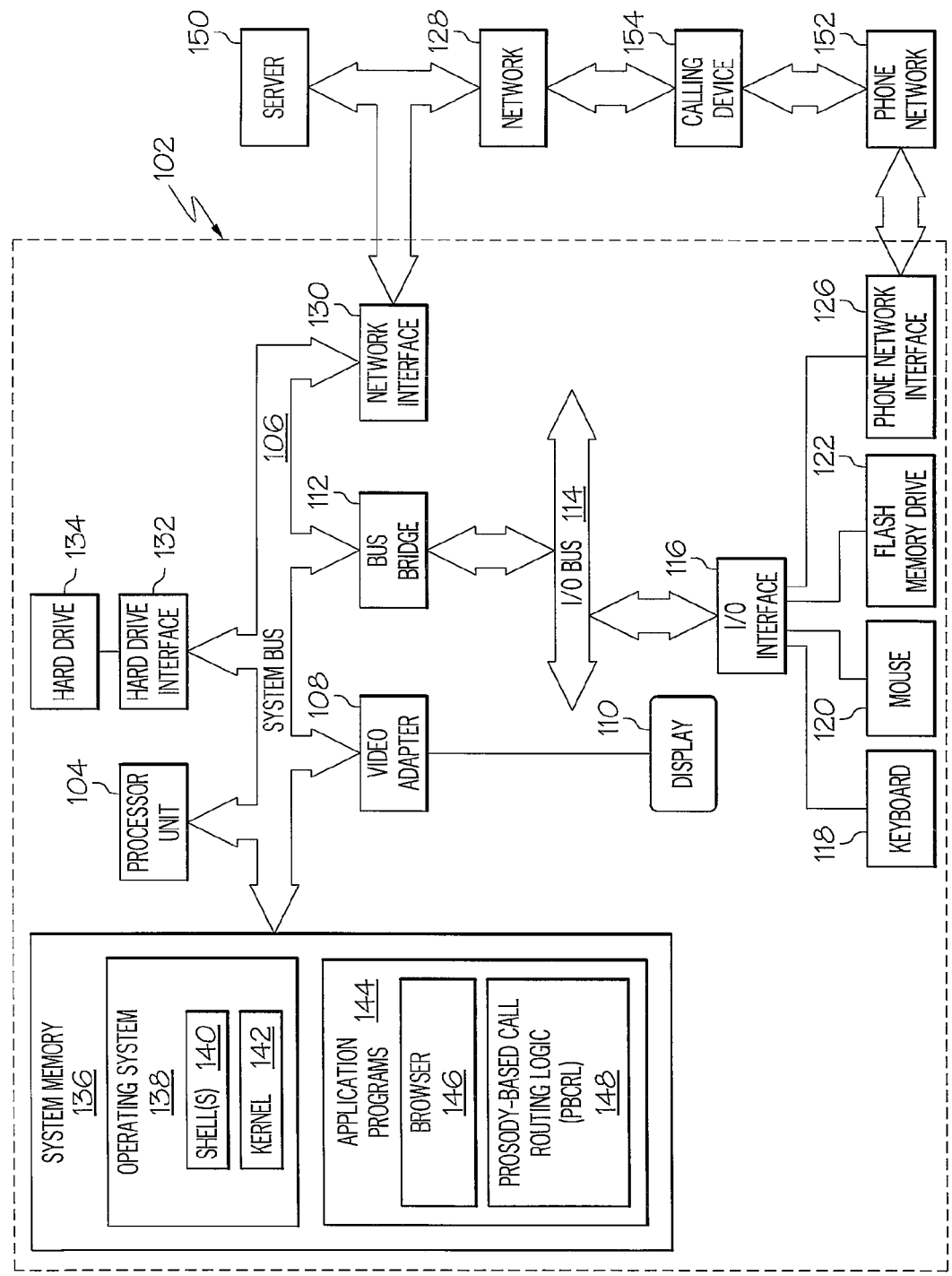
FIG. 1 illustrates an exemplary computer/phone system in which the present invention may be utilized.
Figure 2:
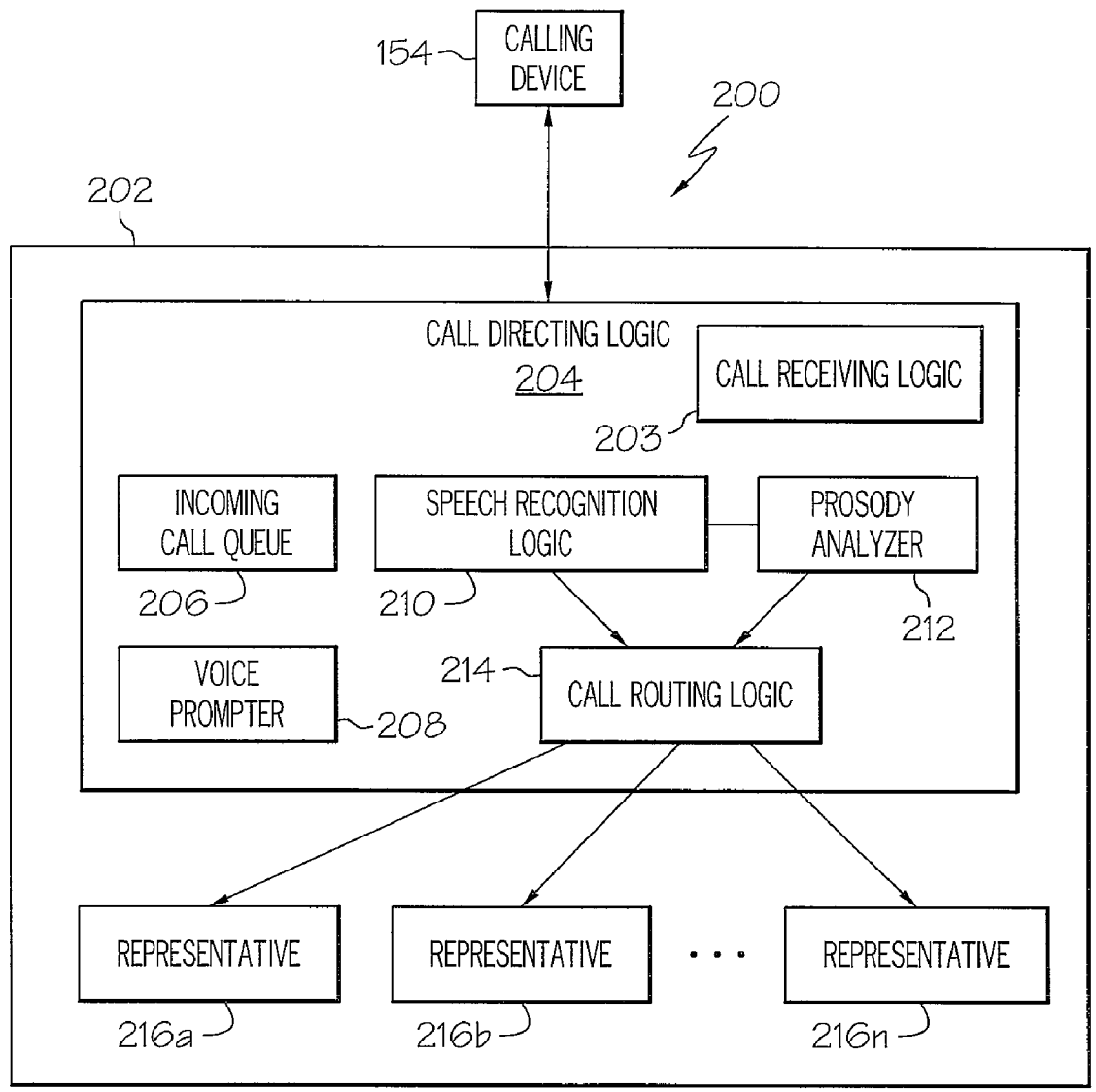
FIG. 2 depicts an exemplary organization of a Call Directing Logic for receiving and forwarding a telephone call based on the prosody of a caller's voice.

With reference now to FIG. 1, there is depicted a block diagram of an exemplary computer 102, which the present invention may utilize for a call directing logic 204 (shown in FIG. 2). Note that some or all of the exemplary architecture shown for computer 102 may also be utilized by software deploying server 150, and that by utilizing appropriate elements of computer 102 (e.g., phone network interface 126), some or all of the architecture shown as computer 102 may be utilized by a calling device 154 (e.g., a land-line telephone, a cellular phone, a "smart" phone, etc.).

Computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a flash memory drive 122, a floppy disk drive 124, and a phone network interface 126. The phone network interface 126 includes any hardware and/or software needed to communicate with a phone network 152, and includes, but is not limited to, a microphone, a speaker, a modulator/demodulator (modem), and other logic needed to provide the functionality of a telephone. Keyboard 118, in cases where some or all of the architecture of computer 102 is used as a telephone, may be a miniaturized keyboard or an alpha-numeric keypad used by a standard telephone (either land-line, cellular or satellite). The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102. Note also that if calling device 154 is a computer based calling device (e.g., using Voice Over Internet Protocol—VoIP or a similar packet based telephonic system), computer 102 (and thus call directing logic 204 shown in FIG. 2) may also communicate with the calling device 154 via the network 128.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using Hyper-Text Transfer Protocol (HTTP) messaging, thus enabling communication with software deploying server 150.

Application programs 144 in computer 102's system memory (as well as software deploying server 150's system memory) also include a Prosody-Based Call Routing Logic (PBCRL) 148. PBCRL 148 includes code for implementing the processes described in FIGS. 2-5B. In one embodiment, computer 102 is able to download PBCRL 148 from software deploying server 150, including in an "on demand" basis, as described in greater detail below in FIGS. 4A-5B.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 150 performs all of the functions associated with the present invention (including execution of PBCRL 148), thus freeing computer 102 from having to use its own internal computing resources to execute PBCRL 148.

With reference now to FIG. 2, an overview of how a voice call 200 is directed from a calling device 154 to an appropriate call recipient (e.g., one of representatives 216a-n, each of whom is equipped with a telephone) in a call center 202 is presented. The voice call 200 is initially received by a call receiving logic 203 in a call directing logic 204. The call receiving logic 203 may initially place the voice call 200 (i.e., the connection information for the voice call 200) in an incoming call queue 206, which puts the call "on hold" while a voice prompter 208 is activated. The voice prompter 208 asks the caller a question, which may be a non-directed question. That is, unlike typical Interactive Voice Response (IVR) systems that ask a caller to verbally choose different options in order to direct the call, the voice prompter 208 is more interested in hearing the caller's voice, in order to evaluate the prosody of the caller's voice. Prosody, as known to those skilled in the art of linguistics, describes an intonation, rhythm, stress and inflection in speech. Thus, prosody is defined as the overall tonal quality of the caller's voice, and includes, but is not limited to, pitch, rhythm, inflection, regional accent, and other phonic qualities that reflect the caller's mood, geographical region of origin or residence, sex, primary language, etc. In one embodiment, the voice prompter 208 presents a specific question (e.g., asking the caller if she is interested hearing about a particular product from a particular person, whose voice may be used in the question that is presented to the caller). The prosody of the caller's response to the question will indicate if the caller is or is not interested in 1) the product or 2) speaking with the particular person who is offering the product.

Thus, a prosody analyzer 212 analyzes the prosody of the caller's voice when responding to a question or other voice prompt presented by the voice prompter 208. By combining an analysis of the prosody (from prosody analyzer 212) with information from a speech recognition logic 210 (e.g., a "Yes" response), a call routing logic 214 is able to direct the voice call 200 to an appropriate call recipient from representatives 216a-n (wherein "n" is an integer). That is, speech recognition logic 210 and prosody analyzer 212 interact with one another, such that an enthusiastic "Yes" response to an offer to hear about a product for sale will be routed differently than a non-committal "Yes" response or a "No" response to the offer. Note that the example of an offer of sale is for exemplary purposes only. That is, the call routing logic 214, under the direction of the speech recognition logic 210 and the prosody analyzer 212, is able to route the voice call 200 to any particular call recipient based on the prosody of the caller's voice, and optionally, based as well on the question posed to and response received from the caller.

Thus, the call center 200 presents an exemplary call directing system that includes a call receiving logic 203 for receiving a telephone call from a caller, a voice prompter 204 for prompting the caller to speak, a prosody analyzer 212 for generating an analysis of a prosody of the caller's voice, and a call routing logic 214 for directing the call to a particular call recipient (e.g., from representatives 216a-n) based on the analysis of the prosody of the caller's voice.

Figure 3:
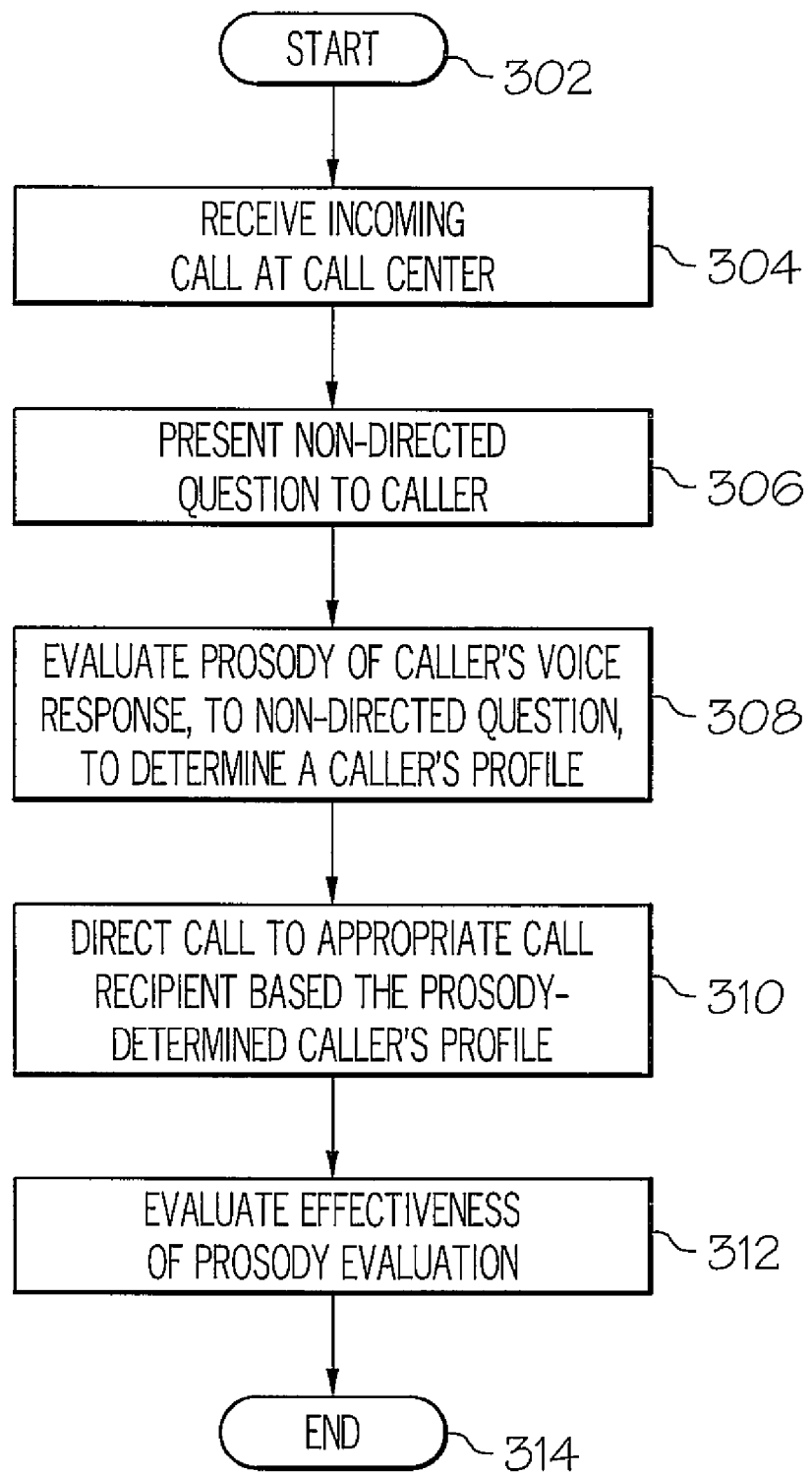
FIG. 3 is a high-level flow-chart describing how to route a phone call based on the prosody of the caller's voice.

Referring now to FIG. 3, a high-level flow-chart of steps taken to route a voice call to an appropriate call recipient is presented. After initiator block 302, during which the call directing logic 204 shown in FIG. 2 may have been configured, an incoming voice call is received (e.g., at a call center), as described by block 304. A non-directed question (i.e., a question that does not directly ask the caller how to route his call) is presented to the caller (block 306). A prosody analyzer then analyzes the caller's voice to determine a profile for the caller, and to determine how the call should be directed/routed (block 308). Thus, based on how the caller answered a non-directed question (Yes/No), the caller's accent, any sign of urgency in the caller's voice, the sex of the caller (as suggested by the timber of the caller's voice), etc., a profile is generated for the caller, and the call is routed according to this profile (block 310). Thus, the call may be directed based on a geographical region dialect of the caller (to place the call to a representative who is physically located in a same geographical region); the sex of the caller (to match tip the caller to a person of the same or opposite sex, and/or to direct the caller to a representative who handles products that are specifically tailored for that sex); the hearing ability of the caller (i.e., a caller who speaks very loud may be assumed to have poor hearing ability, and thus the call is directed to a phone that is pre-configured with a microphone that has extra amplification); the age of the caller (thus matching the caller with one of a similar or different age, and/or to match the caller with a representative who handles products that are directed to those of the caller's age); an indication of urgency in the caller's voice (thus resulting in the caller being placed at the top of the incoming call queue), etc.

At certain selected or pre-selected times, the effectiveness of the prosody evaluation is evaluated (block 312). That is, an evaluation/survey is made to determine if sales/customer satisfaction/repeat calls/etc. went up when the above described process was implemented. A more detailed analysis can determine: the effectiveness of particular questions posed by the voice prompter 208 shown in FIG. 2; whether a recorded or computer-generated voice (male, female, ethnically accented, etc.) being used by the voice prompter is effective or not; if calls are in fact being directed to an appropriate representative, etc. Fine tuning, performed by a team of computer scientists, linguists, sales experts, psychologists, sociologists, etc., can determine how to improve the process in an on-going manner.

The flow-chart ends at terminator block 314.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of PBCRL 148, are performed by service provider server 150. Alternatively, PBCRL 148 and the method described herein, and in particular as shown and described in FIGS. 2-3, can be deployed as a process software from service provider server 150 to computer 102. Still more particularly, process software for the method so described may be deployed to service provider server 150 by another service provider server (not shown).

Figure 4A:
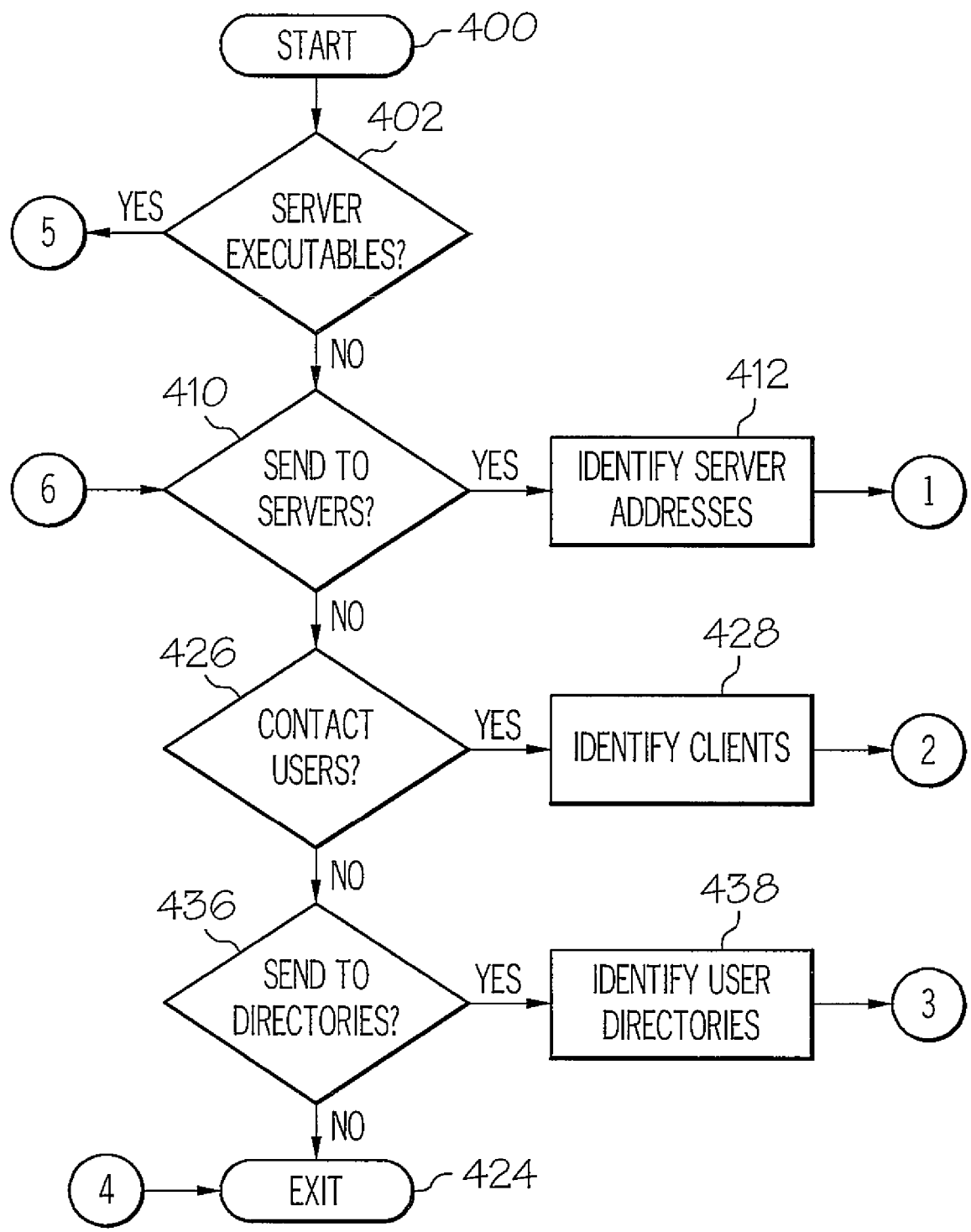
FIGS. 4A-B are flow-charts showing steps taken to deploy software capable of executing the steps and processes described in FIGS. 2-3.
Figure 4B:
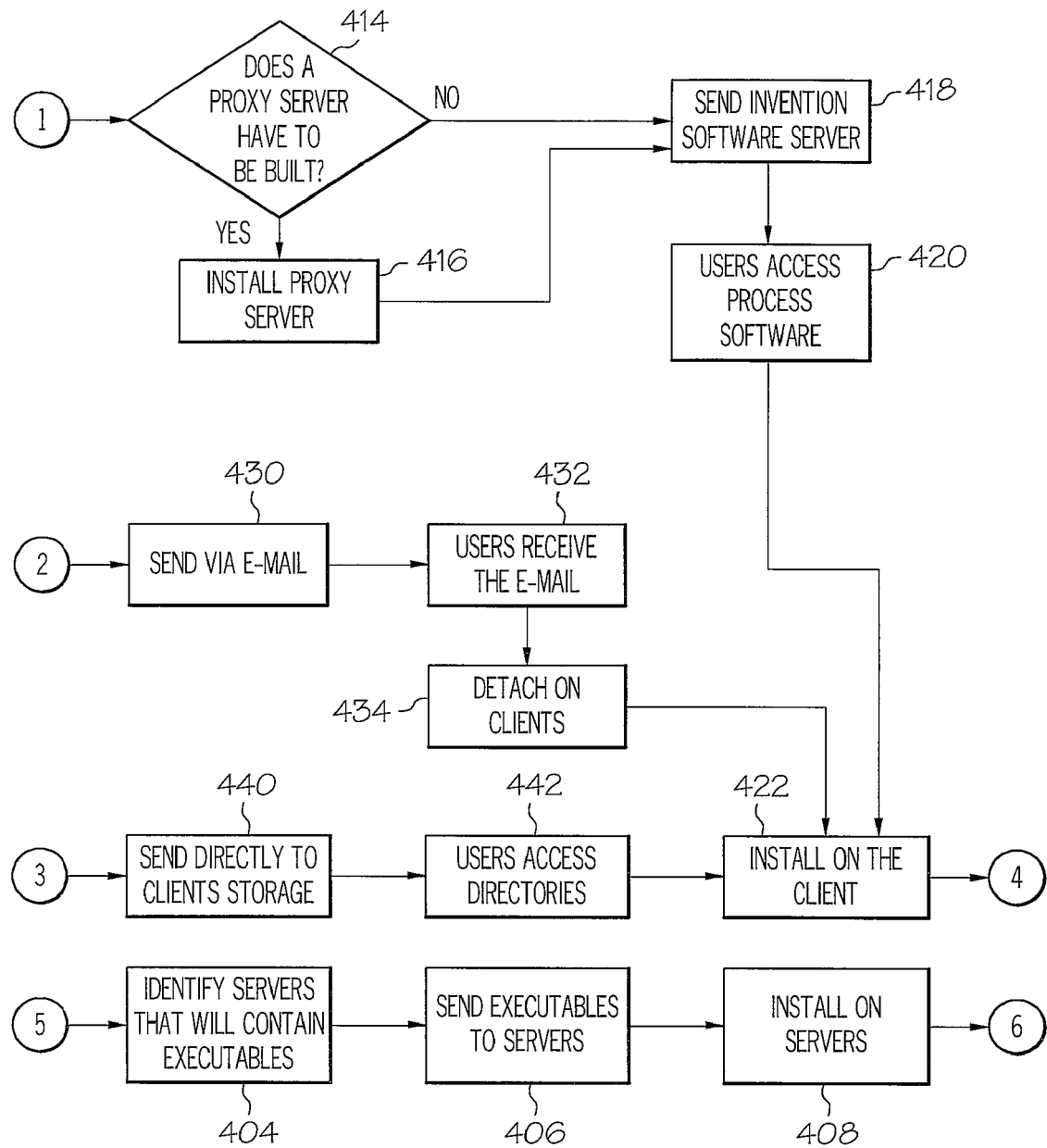

Referring then to FIGS. 4A-B, step 400 begins the deployment of the process software. The first thing is to determine if there are any programs that will reside on a server or servers when the process software is executed (query block 402). If this is the case, then the servers that will contain the executables are identified (block 404). The process software for the server or servers is transferred directly to the servers' storage via File Transfer Protocol (FTP) or some other protocol or by copying though the use of a shared file system (block 406). The process software is then installed on the servers (block 408).

Next, a determination is made on whether the process software is to be deployed by having users access the process software on a server or servers (query block 410). If the users are to access the process software on servers, then the server addresses that will store the process software are identified (block 412).

A determination is made if a proxy server is to be built (query block 414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 416). The process software is sent to the servers either via a protocol such as FTP or it is copied directly from the source files to the server files via file sharing (block 418). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 420). Another embodiment is to have the servers automatically copy the process software to each client and then run the installation program for the process software at each client computer. The user executes the program that installs the process software on his client computer (block 422) then exits the process (terminator block 424).

In query step 426, a determination is made whether the process software is to be deployed by sending the process software to users via e-mail. The set of users where the process software will be deployed are identified together with the addresses of the user client computers (block 428). The process software is sent via e-mail to each of the users' client computers (block 430). The users then receive the e-mail (block 432) and then detach the process software from the e-mail to a directory on their client computers (block 434). The user executes the program that installs the process software on his client computer (block 422) then exits the process (terminator block 424).

Lastly a determination is made as to whether the process software will be sent directly to user directories on their client computers (query block 436). If so, the user directories are identified (block 438). The process software is transferred directly to the user's client computer directory (block 440). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 442). The user executes the program that installs the process software on his client computer (block 422) and then exits the process (terminator block 424).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 5A:
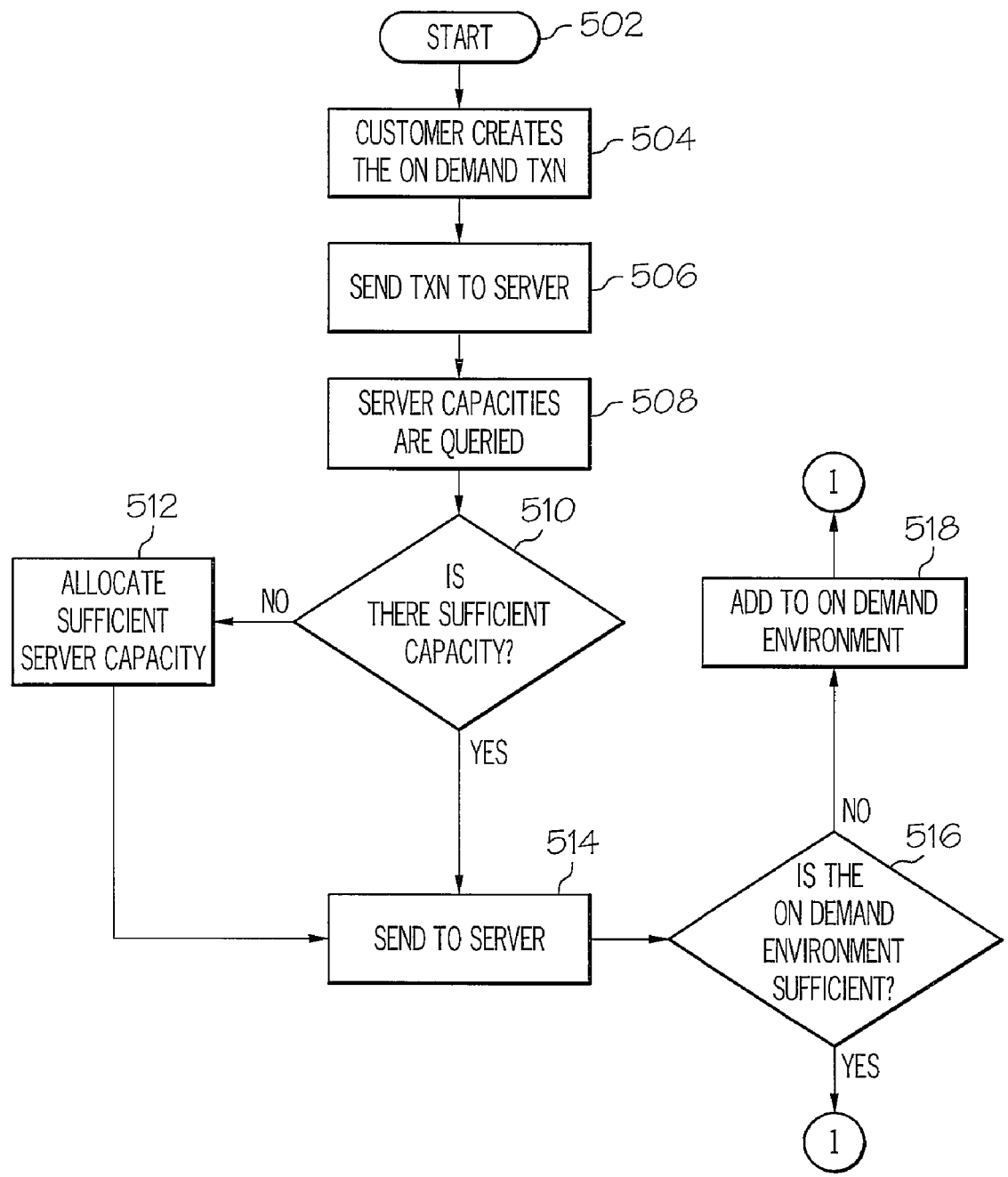
FIGS. 5A-B are flow-charts showing steps taken to execute the steps and processes shown in FIGS. 2-3 using an on-demand service provider.
Figure 5B:
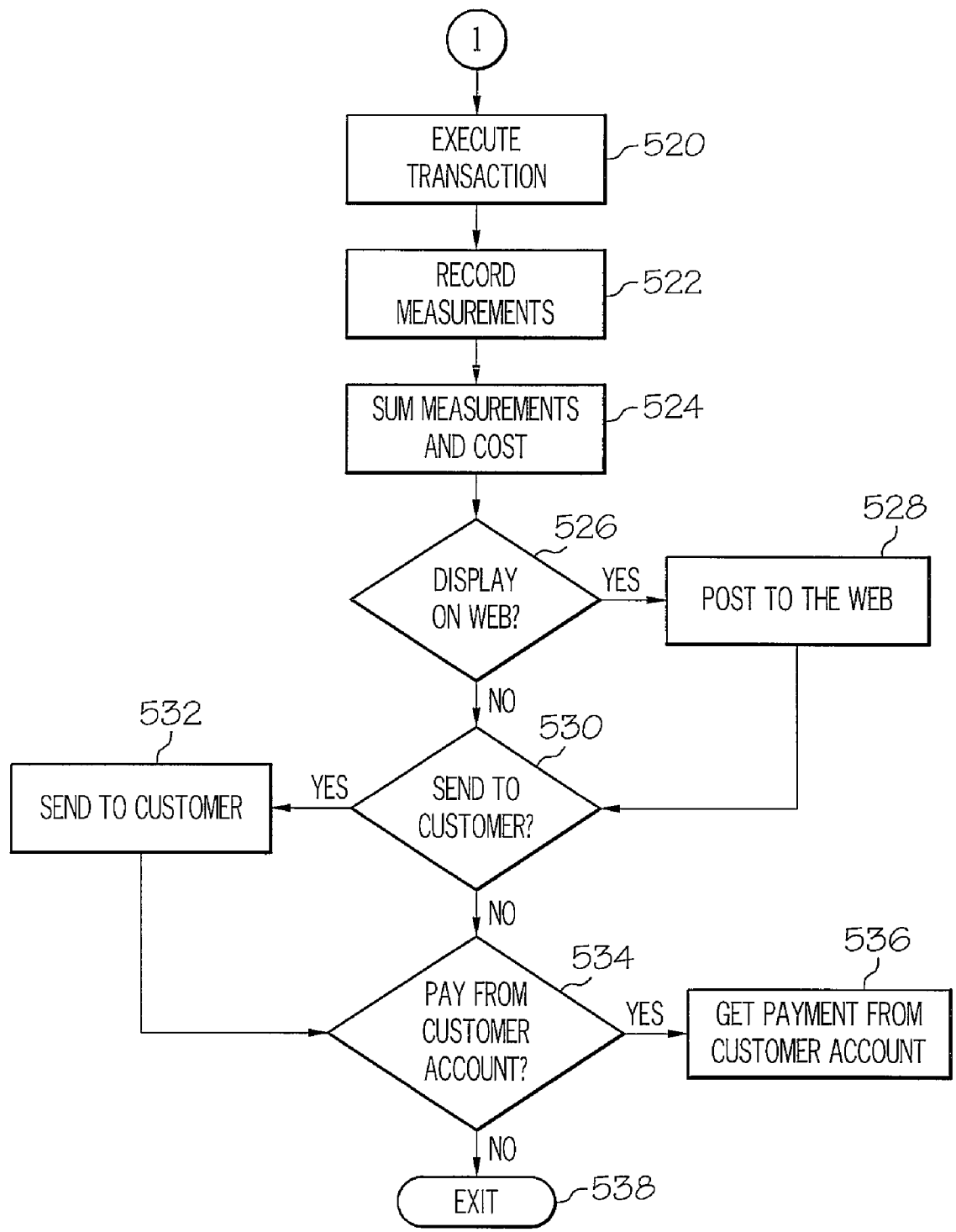

With reference now to FIGS. 5A-B, initiator block 502 begins the On Demand process. A transaction is created than contains the unique customer identification, the requested service type and any service parameters that further, specify the type of service (block 504). The transaction is then sent to the main server (block 506). In an On Demand environment the main server can initially be the only server, then as capacity is consumed other servers are added to the On Demand environment.

The server central processing unit (CPU) capacities in the On Demand environment are queried (block 508). The CPU requirement of the transaction is estimated, then the server's available CPU capacity in the On Demand environment are compared to the transaction CPU requirement to see if there is sufficient CPU available capacity in any server to process the transaction (query block 510). If there is not sufficient server CPU available capacity, then additional server CPU capacity is allocated to process the transaction (block 512). If there was already sufficient available CPU capacity then the transaction is sent to a selected server (block 514).

Before executing the transaction, a check is made of the remaining On Demand environment to determine if the environment has sufficient available capacity for processing the transaction. This environment capacity consists of such things as but not limited to network bandwidth, processor memory, storage etc. (block 516). If there is not sufficient available capacity, then capacity will be added to the On Demand environment (block 518). Next the required software to process the transaction is accessed, loaded into memory, then the transaction is executed (block 520).

The usage measurements are recorded (block 522). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 524).

If the customer has requested that the On Demand costs be posted to a web site (query block 526), then they are posted (block 528). If the customer has requested that the On Demand costs be sent via e-mail to a customer address (query block 530), then these costs are sent to the customer (block 532). If the customer has requested that the On Demand costs be paid directly from a customer account (query block 534), then payment is received directly from the customer account (block 536). The On Demand process is then exited at terminator block 538.

Note that while the present invention has been described in exemplary manner with relation to a call center, the processes described herein may also be utilized in any call receiving entity. For example, a call to an emergency "911" center may utilize prosody analysis to determine if a caller is panicking, suicidal, etc., such that the call can be directed to an appropriate interventionist. Similarly, the methodology described herein can be utilized with any enterprise's switchboard operations, in order to direct a caller to an appropriate department, individual, etc. in an appropriate timely manner.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of routing a telephone call that is placed to a call center, the method comprising:
   receiving, at a call center, a telephone call from a caller;
   a computer prompting the caller to speak, wherein the caller speaks in a caller's voice;
   the computer analyzing a prosody of the caller's voice;
   the computer identifying intonation, rhythm, stress, and inflection characteristics of the caller's voice from the analyzed prosody of the caller's voice;
   creating a profile of the caller from the identified characteristics;
   directing the call to a particular call recipient based on an analysis of the prosody of the caller's voice and the profile of the caller;
   placing incoming calls to the call center in an incoming call queue that schedules the order for answering normal calls to the call center based on a time of receipt of the call relative to other incoming calls placed in the incoming call queue; and
   in response to an analysis of the prosody of the caller's voice providing an indication that the call is of an urgent nature, immediately placing the call at the top of the incoming call queue to direct the call to a next available representative in the call center, whereby a call that is indicated as being of an urgent nature based on the urgency detected within the caller's voice is answered as a next call based on the location of the call at the top of the incoming call queue.

2. A call directing system comprising:
   a call receiving logic that receives a telephone call from a caller and places incoming calls to the call center in an incoming call queue that schedules the order for answering normal calls to the call center based on a time of receipt of the call relative to other incoming calls placed in the incoming call queue;
   a voice prompter that prompts the caller to speak, wherein the caller speaks in a caller's voice;
   a computer-implemented prosody analyzer that:
      generates an analysis of a prosody of the caller's voice;
      identify intonation, rhythm, stress, and inflection characteristics of the caller's voice from the analyzed prosody of the caller's voice; and
      create a profile of the caller from the identified characteristics; and
   a call routing logic that: directs the call to a particular call recipient based on the analysis of the prosody of the caller's voice and the profile of the caller; and in response to an analysis of the prosody of the caller's voice providing an indication that the call is of an urgent nature, immediately placing the call at the top of the incoming call queue to direct the call to a next available representative in the call center, whereby a call that is indicated as being of an urgent nature based on the urgency detected within the caller's voice is answered as a next call based on the location of the call at the top of the incoming call queue.

3. A computer-readable storage device encoded with a computer program, the computer program comprising computer executable instructions configured for:
   receiving, at a call center, a telephone call from a caller;
   prompting the caller to speak, wherein the caller speaks in a caller's voice;
   analyzing, via a computer executing the computer executing instructions, a prosody of the caller's voice; and
   identifying, via the computer, intonation, rhythm, stress, and inflection characteristics of the caller's voice from the analyzed prosody of the caller's voice;
   creating a profile of the caller from the identified characteristics;
   directing the call to a particular call recipient based on an analysis of the prosody of the caller's voice and the profile of the caller;
   placing incoming calls to the call center in an incoming call queue that schedules the order for answering normal calls to the call center based on a time of receipt of the call relative to other incoming calls placed in the incoming call queue; and
   in response to an analysis of the prosody of the caller's voice providing an indication that the call is of an urgent nature, immediately placing the call at the top of the incoming call queue to direct the call to a next available representative in the call center, whereby a call that is indicated as being of an urgent nature based on the urgency detected within the caller's voice is answered as a next call based on the location of the call at the top of the incoming call queue.

4. The method of claim 1, wherein prompting the caller to speak is accomplished by asking the caller a non-directed question, wherein the non-directed question does not directly ask the caller where to direct the call.

5. The method of claim 4, wherein the non-directed question asks the caller to respond to an offer to purchase a product, and wherein the analysis of the prosody of the caller's voice indicates whether the caller is interested in purchasing the product.

6. The method of claim 1, wherein the analysis of the prosody of the caller's voice indicates a geographic regional dialect of the caller's voice, the method further comprising:
  directing the call to a representative in the call center who is located in a same geographic region as that of the caller.

7. The method of claim 1, wherein in response to the analysis of the prosody of the caller's voice indicating a sex of the caller, the method further comprising:
  directing the call to a representative in the call center who is of a same sex as the caller.

8. The method of claim 1, wherein in response to the analysis of the prosody of the caller's voice indicating a sex of the caller, the method further comprising:
  directing the call to a representative in the call center who specializes in services that are tailored to the sex of the caller.

9. The method of claim 1, wherein in response to the analysis of the prosody of the caller's voice resulting in an indication that the caller has a loss of hearing, the method further comprising:
  directing the call to a telephone having a high-amplification microphone, wherein the high-amplification microphone amplifies a voice of a call recipient in the call center to a sound level at which the caller is able to clearly hear the call recipient.

10. The method of claim 1, wherein in response to the analysis of the prosody of the caller's voice resulting in an indication of an age of the caller, the method further comprising:
  directing the call to a representative in the call center who specializes in services that are tailored to a person of the age of the caller.

11. The call directing system of claim 2, wherein:
  the voice prompter prompts the caller to speak by asking the caller a non-directed question, wherein the non-directed question does not directly ask the caller where to direct the call and wherein the non-directed question asks the caller to respond to an offer to purchase a product, and wherein the analysis of the prosody of the caller's voice indicates whether the caller is interested in purchasing the product;
  in response to the analysis of the prosody of the caller's voice indicating a geographic regional dialect of the caller's voice, the call routing logic directs the call to a representative in the call center who is located in a same geographic region as that of the caller;
  in response to the analysis of the prosody of the caller's voice indicating a sex of the caller, the call routing logic directs the call to a representative in the call center who is of a same sex as the caller;
  in response to the analysis of the prosody of the caller's voice indicating a sex of the caller, the call routing logic directs the call to a representative in the call center who specializes in services that are tailored to the sex of the caller; and
  in response to the analysis of the prosody of the caller's voice resulting in an indication of an age of the caller, the call routing logic directs the call to a representative in the call center who specializes in services that are tailored to a person of the age of the caller.

12. The call directing system of claim 2, wherein in response to the analysis of the prosody of the caller's voice resulting in an indication that the caller has a loss of hearing, the call routing logic directs the call to a telephone having a high-amplification microphone, wherein the high-amplification microphone amplifies a voice of a call recipient in the call center to a sound level at which the caller is able to clearly hear the call recipient.

13. The computer-readable storage device of claim 3, wherein prompting the caller to speak is accomplished by asking the caller a non-directed question, wherein the non-directed question does not directly ask the caller where to direct the call.

14. The computer-readable storage device of claim 13, wherein the non-directed question asks the caller to respond to an offer to purchase a product, and wherein the analysis of the prosody of the caller's voice indicates whether the caller is interested in purchasing the product.

15. The computer-readable storage device of claim 3, wherein the analysis of the prosody of the caller's voice indicates a geographic regional dialect of the caller's voice, the computer-readable storage medium further comprising executable instructions configured for:
  directing the call to a representative in the call center who is located in a same geographic region as that of the caller.

16. The computer-readable storage device of claim 3, wherein the analysis of the prosody of the caller's voice indicates a sex of the caller, the computer-readable storage medium further comprising executable instructions configured for:
  directing the call to a representative in the call center who is of a same sex as the caller.

17. The computer-readable storage device of claim 3, wherein the analysis of the prosody of the caller's voice indicates a sex of the caller, the computer-readable storage medium further comprising executable instructions configured for:
  directing the call to a representative in the call center who specializes in services that are tailored to the sex of the caller.

18. The computer-readable storage device of claim 3, wherein:
  in response to the analysis of the prosody of the caller's voice resulting in an indication of an age of the caller, the computer-readable storage medium further comprising executable instructions configured for directing the call to a representative in the call center who specializes in services that are tailored to a person of the age of the caller; and
  in response to the analysis of the prosody of the caller's voice resulting in an indication that the caller has a loss of hearing, the computer-readable storage medium further comprising executable instructions configured for directing the call to a telephone having a high-amplification microphone, wherein the high-amplification microphone amplifies a voice of a call recipient in the call center to a sound level at which the caller is able to clearly hear the call recipient.

19. The computer-readable storage device of claim 3, wherein the computer-readable storage medium is a component of a remote server, and wherein the computer executable instructions are deployable to a supervisory computer from the remote server.

20. The computer-readable storage device of claim 3, wherein the computer executable instructions are capable of being provided by a service provider to a customer on an on-demand basis.

* * * * *